E. Clark,
Saw Teeth.
N° 6,258.   Patented Apr. 3, 1849.

UNITED STATES PATENT OFFICE.

EBENEZER CLARK, OF RUSHVILLE, ILLINOIS.

SAW.

Specification of Letters Patent No. 6,258, dated April 3, 1849.

*To all whom it may concern:*

Be it known that I, EBENEZER CLARK, of Rushville, in the county of Schuyler and State of Illinois, have invented a new Saw; and I do hereby declare that the following is a full and exact description of the construction and operation of the same, reference being had to the annexed drawings, making part of this specification, in which—

Figure 1:
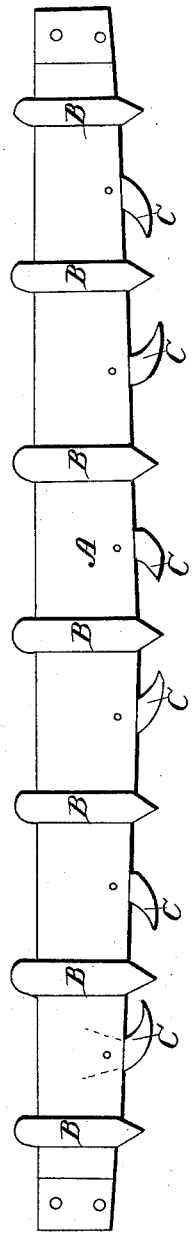

Figure 1, is a vertical sectional view. A, is the blade. B, is flat movable teeth which are inserted on both sides of the blade, in dovetail grooves, and which are made long so that they may be let down as fast as they wear, very sharp and thin at the point so that they may sink as much as possible. C, the cleaving teeth, or which might be called splitters in a cross cut saw they hang on a rivet or screw quite loose (those of the middle being too tight) they are placed between every pair of the flat teeth, B, and the points of every other one are placed in opposite directions so that when the saw is pulled to the right the points of those which are turned to the left will raise and admit those turned to the right to gouge or clear.

Figure 2:

Fig. 2, is a perspective view of A, in Fig. 1. D, are the dovetailed grooves in which the teeth B, are made to fit. E, are the mortises in which the teeth C, are to be inserted.

The advantages that this saw has over the old, is, that in the first place, instead of scratching as the latter does, it cuts and clears at the same time. Secondly. It will cut a great deal more in the same space of time. Thirdly. The teeth can be made of the best kind of steel and the quantity required will be comparatively small. Fourthly. It will keep sharp longer, the friction not being across the edge of the teeth, as in the old. Fifth. If any of the teeth should break they can be replaced at little expense. Sixth. The blade can be made of solid iron and will last a man's life time.

What I claim as my invention and desire to secure by Letters Patent is—

The movable and loose teeth, (B, and C,) in any kind of saw regardless of shape or form, or manner of insertion for I am aware that they can be made, in other shapes and placed in blades made different that would answer as well.

EBENEZER CLARK.

Witnesses:
L. F. MORRIN,
JAMES L. ANDERSON.